Figure 1:
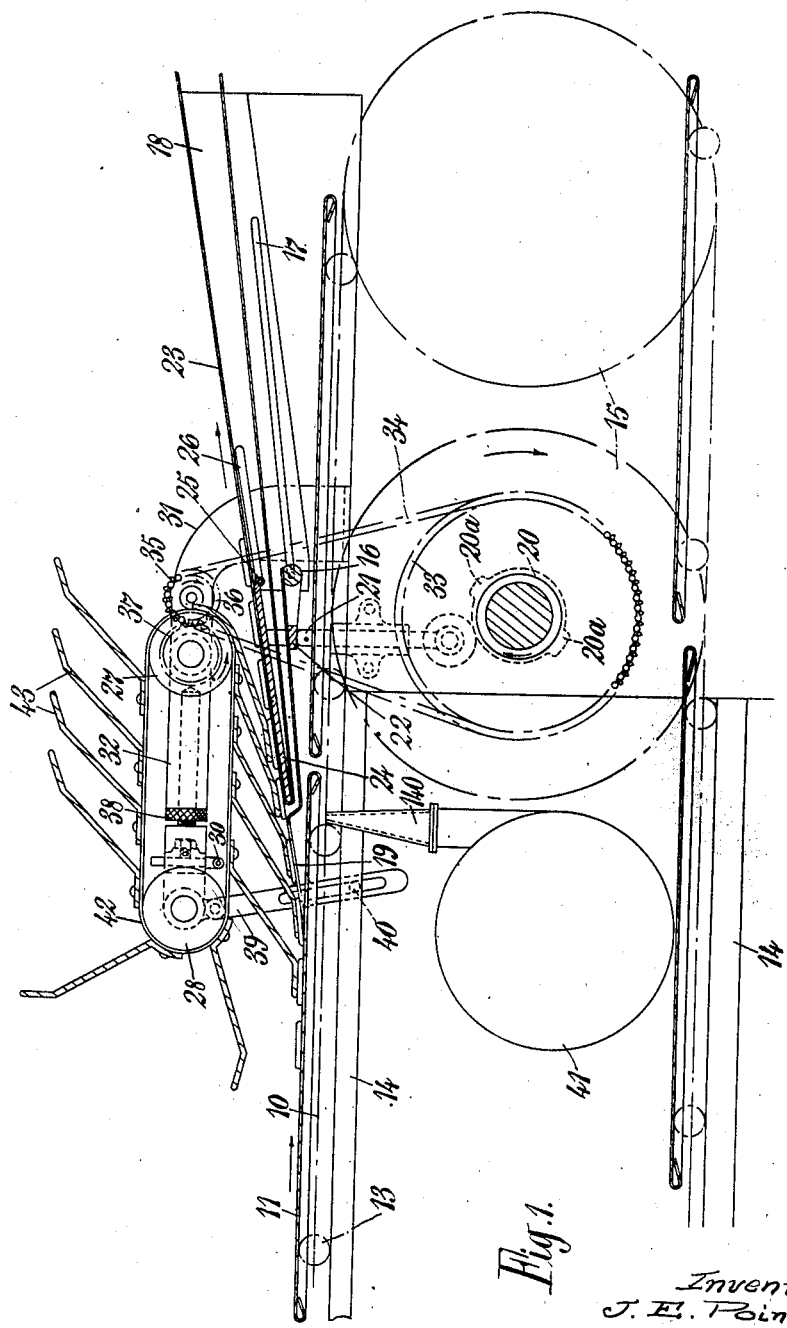

Dec. 24, 1940.   J. E. POINTON   2,226,323
DISCHARGE OF BISCUITS OR THE LIKE FROM PANS OR WIRES CARRIED
BY OVEN OR LIKE CONVEYERS
Filed July 19, 1939   4 Sheets-Sheet 3

Inventor,
J. E. Pointon
By: Glascock Downing Seebold
Atts.

Dec. 24, 1940.  J. E. POINTON  2,226,323
DISCHARGE OF BISCUITS OR THE LIKE FROM PANS OR WIRES CARRIED
BY OVEN OR LIKE CONVEYERS
Filed July 19, 1939   4 Sheets-Sheet 4
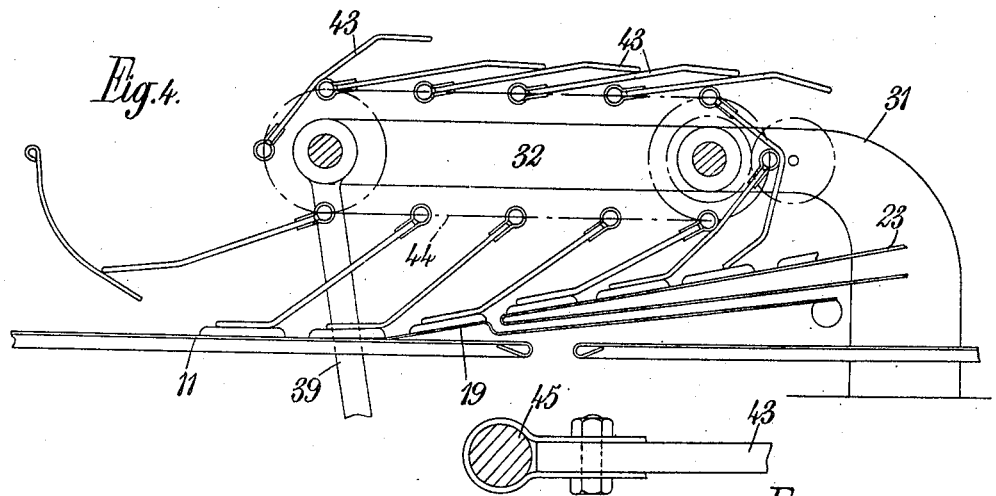
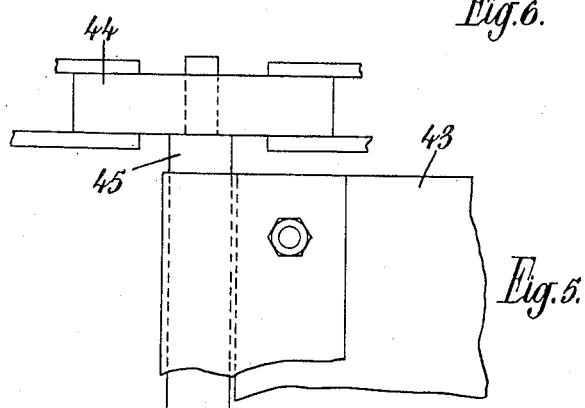
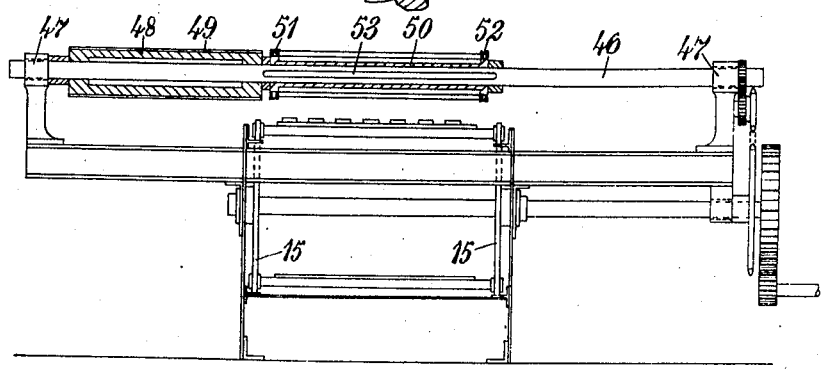
Inventor,
J. E. Pointon
By: Glascock Downing & Seebold
Attys.

Patented Dec. 24, 1940

2,226,323

UNITED STATES PATENT OFFICE 2,226,323

DISCHARGE OF BISCUITS OR THE LIKE FROM PANS OR WIRES CARRIED BY OVEN OR LIKE CONVEYERS

John Edward Pointon, Peterborough, England

Application July 19, 1939, Serial No. 285,401
In Great Britain June 9, 1938

3 Claims. (Cl. 107—7)

This invention relates to means for discharging biscuits or plaque-like articles from pans, trays or wires mounted upon or carried by oven or like endless conveyers.

In the biscuit baking art, pans or trays comprising flat metal plates and trays made of wire mesh or net, usually called "wires," are both used in conjunction with oven or like conveyers so that sometimes an oven may be running with pans and at other times the wires may be utilized, and it will be appreciated that means which are suitable for discharging the biscuits from a flat surface, such as presented by oven pans, are not suitable for removing the biscuits from the more or less rough or reticulated surface of wires and vice versa.

An aim of the present invention is to provide for a continuous automatic discharge of biscuits from an oven or like conveyer whether pans or wires are being employed upon it, whilst a further aim of the invention is automatically to discharge biscuits from pans or wires when leaving the oven on to a cooler or other conveyer without the necessity of synchronizing or coupling together of the oven to the cooler or conveyers.

A further aim of the invention is to provide for the continuous discharge or delivering of biscuits from pans or alternatively from wires of an oven to a cooler or other conveyer.

The invention consists in a machine for discharging biscuits or like articles from pans or wires carried by an oven or like endless conveyer having interchangeable band means comprising in the one case a series of arms or flaps affording a top drive for the biscuits in conjunction with spring fingers for discharging from pans and in the other case an air pervious band operable in conjunction with air pressure means adapted to lift biscuits from wires and hold them against the band.

According to the invention alternative discharge means are mounted for transferring the biscuits or the like from pans or wires carried by oven or like conveyers to another conveyer in conjunction with adjustment means for rendering available one of the discharge means to the exclusion of the operation of the other according to whether pans or wires are being conveyed to the discharge station.

In one form the alternative discharge means comprise a device whereby the biscuits are lifted from the wires and held by air pressure against the under lap of a moving transfer conveyer, a resilient finger stripping device adapted to engage the pans and peel or strip the biscuits therefrom and means for rendering the transfer conveyer and the finger device displaceable, so that either may be put out of action when the other is required.

The finger discharge means may be of the character described in U. S. Patent No. 2,046,832 to MacFarlane, dated July 7, 1936, while the air pressure transfer means may be by an air blast also known from the prior art. In conjunction with the finger device means may be provided for affording a top drive or traction to the biscuits as they mount or travel up the fingers and this top driving means may be of the character described in said Patent No. 2,046,832 or British Patent No. 456,747 accepted Nov. 13, 1936.

A receiving conveyer is preferably provided and associated with both the air blast transfer means and the finger stripping means and this conveyer is provided at the end adjacent its receiving station with a telescopic or longitudinal adjustable terminal plate or knife edge within a canvas or like endless band so that the position of the receiving edge of the conveyer with respect to the travel of the pans or wires can be changed.

In order to take up or give out slack in the conveyer band occasioned by the displacement of the knife edge, a roller is mounted in bearings located in a longitudinal slideway.

A pair of spaced rollers are provided for the endless transfer conveyer referred to above which may be in the form of wire mesh, such for example as is known in the chocolate art as "enrober wire" and when a top drive for the biscuits is employed an apron or chain device carrying biscuit engaging flaps may be united in an endless band around the rollers and over the enrober wire. The rear roller of the pan is displaceably mounted so that it may be moved from a position adjacent the path of the pans or wires to an elevated position suitable for the action of the top drive means.

Figure 2:
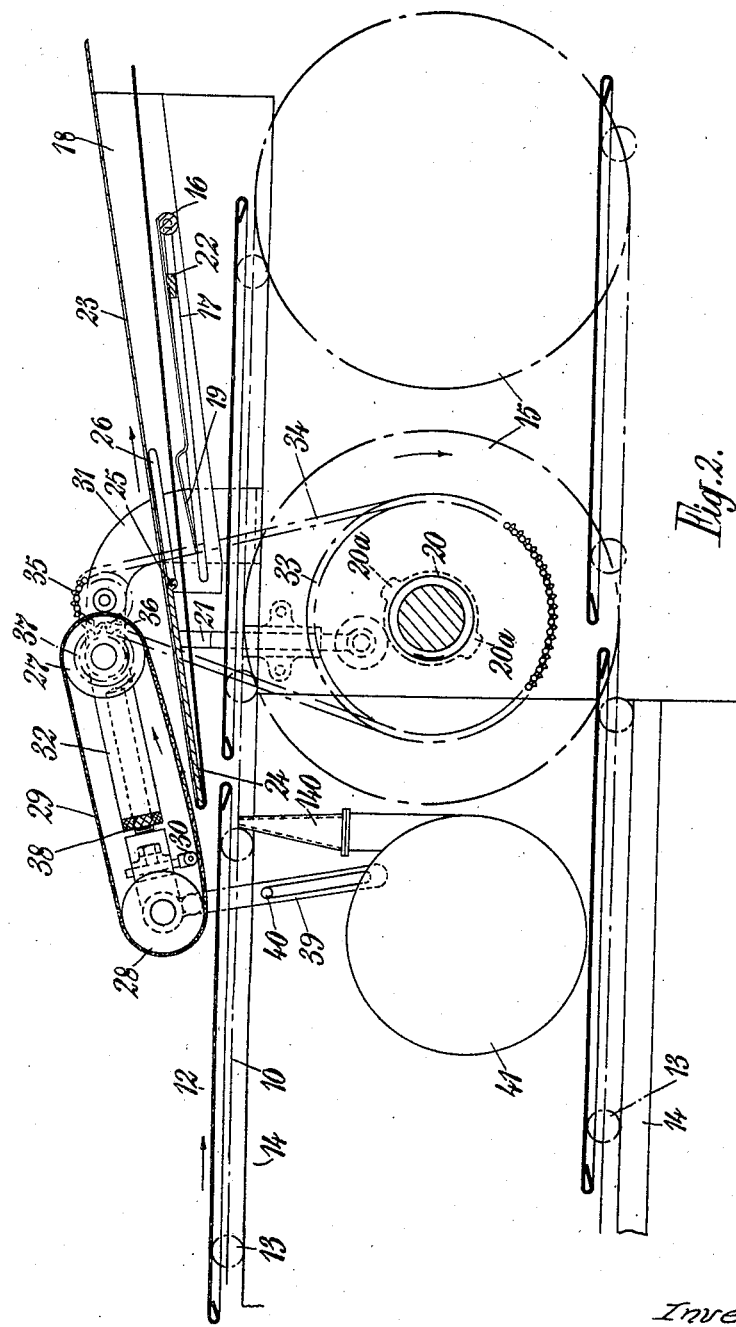
Figure 3:
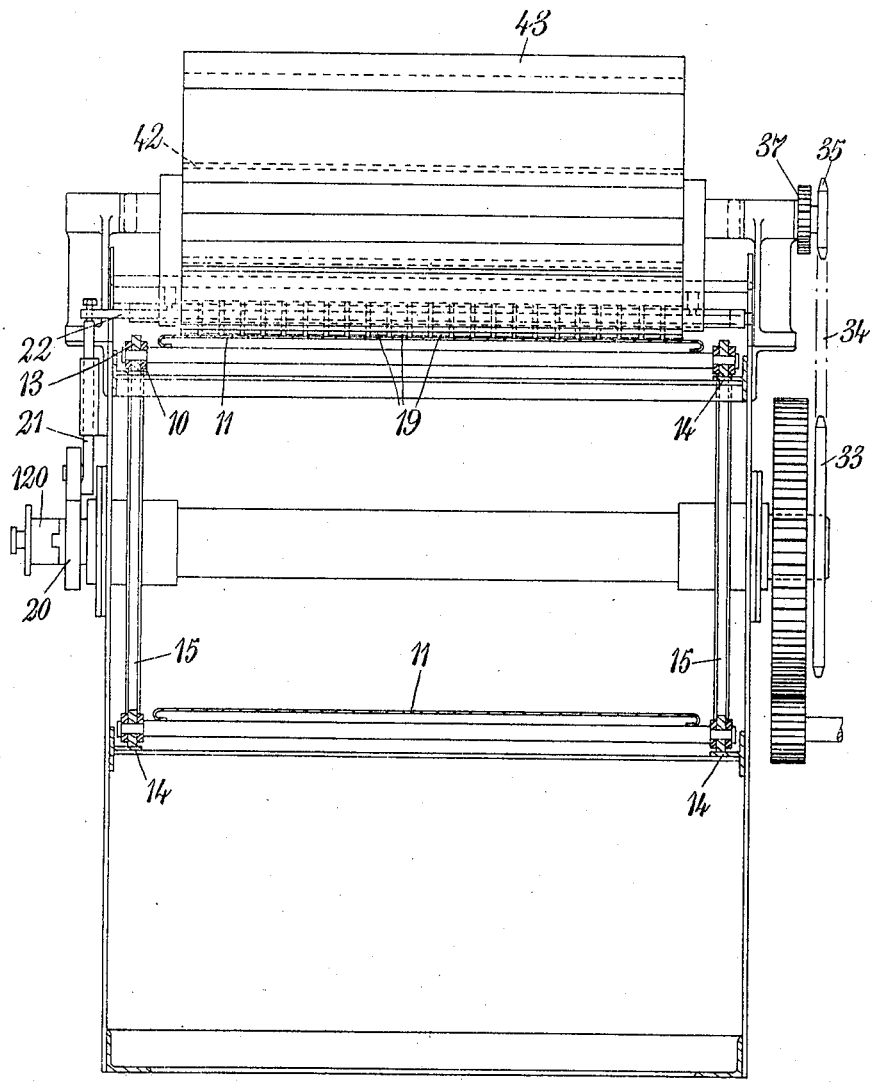

In the accompanying drawings,

Figure 1 is a side elevation of a biscuit discharging apparatus according to the invention as arranged for pans, Figure 2 is a side elevation of the apparatus as arranged for wires, Figure 3 is an end elevation corresponding to Figure 1, Figure 4 is an elevation of an alternative arrangement of top drive for the biscuits, Figures 5 and 6 being plan and elevation showing details, Figure 7 is an end view of a modification.

In carrying the invention into effect according to one convenient mode as described by way of example, an oven conveyer 10 adapted to accommodate either pans 11 (Figure 1) or wires 12 (Figure 2) is arranged so that its end runs out of the oven a sufficient distance to afford a discharging station upon its upper lap. The conveyer is provided with rollers 13 engaging tracks 14, and pairs of sprocket wheels 15 are provided whereby the pans or wires are maintained horizontal during their passage from the upper to the lower lap.

A cross bar or frame 16 is mounted in bearings which are capable of reciprocation on rails or in slideways 17 arranged in side plates 18 adjacent the discharge station. Upon this cross bar or frame 16 a series of spring or resilient fingers 19 is provided such as is described in said prior Patent No. 2,046,832 the arrangement being such that the fingers 19 lie at a small angle with respect to the pans and such that their tips engage and slide over the surface of the pans as they travel forward. Rocking or lifting means such as a cam 20 or crank device are provided for the cross shaft or frame and operated in synchronism with the passage of the gaps between the pans 11 so that the spring fingers are raised as the tail of each pan passes beneath the finger tips to jump the gap between the tail of one pan and the head of the next.

The cam actuates a reciprocating bar 21 which engages a cross strip 22 secured to all the spring fingers 19. The cam is mounted upon the shaft of the inner sprocket 15 and is provided with opposite nodes 20a as one revolution of the cam corresponds to the passage of two pans 11. A clutch 120 is provided so that the drive to the cam may be disconnected when discharging from wires.

The slidable mounting of the finger cross bar 16 enables it and its fingers to be displaced from a suitable position for engaging the pans and stripping the biscuits as shown in Figure 1 to an idle position in advance of the discharge station as shown in Figure 2. The operative ends of the spring fingers 19 are cranked or bent so that when the fingers are in the stripping position the latter are disposed so that the upper surface of the cranked portions of the fingers lies substantially in the plane of the upper run of a receiving conveyer 23 which may be used as an intermediate conveyer between the pans and a cooling conveyer. This intermediate conveyer 23 has a longitudinally slidable knife edge or terminal plate 24 arranged inside the conveyer band.

The knife edge or plate 24 is carried by a bar 25 engaging in slots 26 in the side plates 18 whereby adjustment of the position of the plate and the receiving end of the conveyer may be effected.

The knife edge 24 is supported by means of the reciprocating bar 21 so that the knife edge (and conveyer end) will be raised to give clearance for the spring fingers 19 each time the fingers are raised by the cam 20.

The conveyer band 23 is passed in known manner around a driving roller (not shown) against which it is held by guide rollers and it also is passed around a compensating roller which is longitudinally displaceable to take up or give out slack in the band according to the adjustment of the knife edge 24.

A pair of rollers 27, 28 are mounted transversely of both the oven and receiving conveyers for supporting an air pervious endless band 29 which may be formed of enrober wire. These rollers are positioned so that the endless band 29 overlies the position at which the biscuits leave the oven conveyer either when pans or when wires are used.

For the purpose of adjusting the path of travel of the lower lap of the air pervious band a locating roller 30 engages the back of such lap and pushes it out of the normal line of travel between its supporting rollers 27 and 28. The roller 27 is mounted in brackets 31 to which arms 32 carrying the roller 28 are pivotally mounted. Suitable means comprising a chain and sprocket drive 33, 34, 35 and spur gears 36, 37 are provided for driving the roller 27 at an appropriate speed or speeds from the oven conveyer.

It is preferred that the operative lap of the pervious band shall have a sag as indicated in Figure 2, and for this purpose the roll 28 is positively driven by a chain from the roll 27.

The arms 32 are adjustable by screw gear 38 whereby the desired tension may be applied to the band 29 to provide a friction drive thereto by the roller 27.

The forward roller 27 is elevated somewhat with respect to the roller 28 and is disposed over the knife edge 24 of the intermediate conveyer 23. The other roller 28 may be adjusted vertically by pivoting the arms 32 so that the roller may be moved from a position adjacent the oven conveyer path to any other position as may be required. The arms 32 are held in their adjusted positions by slotted links 39 having locking nuts 40, such links being pivotally connected to the bearing for the roller 28.

In the position indicated in Figure 2 the intermediate conveyer knife edge 24 with the conveyer band 23 passing around it just clears the path of the wires and immediately in front of the edge of the conveyer and beneath the upper lap of the oven conveyer is mounted a transverse header or manifold 140 having upon it a plurality of air jets or nozzles or a continuous narrow air-blowing slot. This header or manifold is connected to a fan or blower 41 which may be situated in any convenient position and driven to create an air blast through the jets or slot such as is capable of raising or tilting the biscuits on to the intermediate conveyer.

Assuming the spring fingers 19 to have been retracted as shown in Figure 2, the fan or blower operates so that the air blast is directed through the path of the wires 12. The biscuits on the wires are progressively elevated by the blast and pressed against the under lap of the air pervious band 29 and as this is moving forwardly the biscuits are carried with it and deposited upon the end of the intermediate conveyer 23 as soon as they get out of the zone of action of the air blast.

When changing over from the use of wires to the use of pans, a canvas apron 42 carrying a series of flexible flaps 43 such as is described in the above mentioned Letters Patent No. 2,046,832 or the above mentioned British Patent No. 456,747 is secured by clip, hook, or other fastening means in an endless band around the two rollers 27 and 28 and over the air pervious band 29, or, if desired, the band 29 may be first removed.

According to another form (see Figures 4, 5, 6)

the rollers 27 and 28 may have chain wheels at each end around which a pair of chains, which may be of the Bagshawe type, are attachable.

The links of these chains 44 or certain of them are united by transverse bars or rods 45 to which flaps 43 such as are referred to above are hung. The chains and rods are placed around the chain wheels over the air pervious band and the ends of the chains are secured together. Alternatively the air pervious band may first be removed.

When either of these flap-carrying means is applied to the rollers 27, 28 or over the air pervious band, the rear roller 28 is moved upwardly so that in descending the lower lap the flaps 43 trail over the spring fingers 19, assuming such to be in the operative position. The biscuits are peeled from the pans by the fingers 19 and at the same time they are wiped by the flaps 43 and assisted up the slope of the fingers until they pass therefrom on to the moving surface of the intermediate conveyer 23.

When the wires are being used in the oven, the top driving device is not required and is removed from the rollers 27, 28 and the air pervious band. The rear roller 28 is moved to its lower position and the locating roller 30 is adjusted so as to bring the air pervious band appropriately close to the path of the biscuits and to the position where they leave the wires. The cross bar or frame 16 carrying the stripping fingers 19 is slid forwardly to a position underneath the forward end of the intermediate conveyer.

According to another mode of transferring biscuits from the oven conveyer to the receiving conveyer a suction device such as described in British patent specification No. 319,227 accepted Sept. 12, 1929 may be employed either alone or in conjunction with an air blast, with the result that the biscuits are lifted and held against the underside of the travelling transfer surface or conveyer and deposited on the receiving conveyer as they pass out of the zone of pressure, holding them against the underside of the conveying surface.

Instead of wrapping the top drive conveyer 42, 43 round and over the air pervious band a double set of rollers or their equivalent may be mounted for lateral displacement to effect the changeover. Thus a driving spindle 46 (Figure 7) mounted on bearings 47 projects beyond either side of the machine. The spindle supports a roller 48 adapted to drive an air pervious band 49 and also a roller or sleeve 50 having chain wheels 51, 52. The rollers 48 and 50 are capable of axial movement on the spindle so that they may alternately occupy the central position for operation where they are keyed to the spindle by the spline 53.

The chain wheels drive chains of the character described with reference to Figures 4–6, such chains having top drive flaps secured thereto.

Corresponding to the spindle 46 a second spindle is provided which carries freely rollers corresponding to the rollers 48 and 50 and by which the air pervious band and flap band are supported. The second spindle is mounted in pivotal arms so that it may be adjusted vertically in a similar manner to the adjustment of roller 28 (Figures 1 and 2) according to the take-off device operating for the time being.

It will be appreciated that according to Figure 7 the pan discharge means is in position for use and in order to change over to wires the rollers 48 and 53 together with their corresponding rollers on the second spindle are slid to the right to bring the roller combination 48 above the oven band. At the same time the spring fingers are retracted and the second spindle lowered to bring the air pervious band 49 into operative position.

It will be understood that other means may be provided instead of those described for providing the transposition of the pervious conveyer, the top driving means and/or the spring fingers.

I claim:

1. In a biscuit making machine having a conveyer adapted to support biscuit carriers of different forms, a transfer mechanism including spring fingers for engaging and loosening biscuits from the biscuit carriers, of one form, movable means arranged above the carriers for moving biscuits along said fingers, and means movably mounting said fingers for displacement to an inoperative position with respect to the biscuit carriers and said biscuit moving means.

2. A machine as claimed in claim 1 characterized by the provision of a bar carrying said fingers and reciprocable in said mounting means.

3. In a biscuit making machine having a conveyer adapted to support biscuit carriers of different forms, a transfer mechanism including spring fingers for engaging and loosening biscuits from biscuit carriers of one form, separate biscuit moving means arranged above the biscuit carriers and respectively movable into operative position with relation thereto, and means movably mounting said fingers for displacement to an inoperative position with respect to said biscuit carriers.

JOHN EDWARD POINTON.